(12) United States Patent
Fürst

(10) Patent No.: US 7,618,700 B2
(45) Date of Patent: *Nov. 17, 2009

(54) FILM-BITUMEN COMBINATION

(75) Inventor: Michael Fürst, Forchheim (DE)

(73) Assignee: Huhtamaki Forchheim Zweigniederlassung der Huhtamaki Deutschland GmbH & Co. KG, Forchheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/680,012

(22) Filed: Oct. 7, 2003

(65) Prior Publication Data

US 2004/0109985 A1 Jun. 10, 2004

(30) Foreign Application Priority Data

Oct. 8, 2002 (DE) ................. 102 46 864

(51) Int. Cl.
*B32B 3/00* (2006.01)
*B32B 9/00* (2006.01)
*B32B 11/00* (2006.01)
*B32B 33/00* (2006.01)
*B32B 3/14* (2006.01)
*B32B 3/16* (2006.01)
*B32B 23/02* (2006.01)

(52) U.S. Cl. ............... 428/156; 428/40.1; 428/40.3; 428/41.8; 428/489; 428/192; 428/189; 428/60; 428/58; 428/77; 428/78

(58) Field of Classification Search ........... 428/156, 428/489, 40.1, 40.3, 41.8, 192, 77, 78, 57, 428/58, 60, 189; 52/419, 420, 415, 416
See application file for complete search history.

(56) References Cited

U.S. PATENT DOCUMENTS

| | | | | |
|---|---|---|---|---|
| 3,686,060 A | * | 8/1972 | Gurtler | 428/78 |
| 3,900,102 A | * | 8/1975 | Hurst | 206/411 |
| 4,115,619 A | | 9/1978 | Kurfman et al. | |
| 4,396,665 A | * | 8/1983 | Rowe | 428/148 |
| 4,442,148 A | * | 4/1984 | Stierli | 428/40.3 |
| 4,757,652 A | * | 7/1988 | Kalkanoglu | 52/420 |
| 4,992,315 A | * | 2/1991 | Zickell et al. | 428/40.3 |
| 5,449,552 A | | 9/1995 | Bochow et al. | |
| 5,687,517 A | * | 11/1997 | Wiercinski et al. | 52/177 |
| 5,824,401 A | * | 10/1998 | Jenkins et al. | 428/215 |
| 5,998,015 A | | 12/1999 | Furst | |
| 2004/0109968 A1 | * | 6/2004 | Furst | 428/40.1 |

FOREIGN PATENT DOCUMENTS

DE 20019212 U1 * 3/2001

* cited by examiner

*Primary Examiner*—David R Sample
*Assistant Examiner*—Catherine Simone
(74) *Attorney, Agent, or Firm*—Collard & Roe, P.C.

(57) ABSTRACT

Film-bitumen combination with at least three layers is used in particular as a membrane to cover roof areas. At least two film layers of the combination are made from different materials.

17 Claims, 2 Drawing Sheets

FILM-BITUMEN COMBINATION

CROSS REFERENCE TO RELATED APPLICATIONS

Applicant claims priority under 35 U.S.C. §119 of German Application No. 102 46 864.8 filed Oct. 8, 2002.

BACKGROUND OF THE INVENTION

1. Field of the Invention

The present invention relates to a film-bitumen combination with at least three layers that is used in particular as a membrane to cover roof areas.

2. The Prior Art

Many different backing films have been disclosed for bitumen membranes that are designed in particular to seal roof areas, but all of them have serious disadvantages. As a result of the migration of mineral oils into the plastic web as well as of thermal expansion of both the bitumen membrane and the plastic film, the plastic film detaches from the bitumen membrane in the course of time (curling). The material combinations often have very low thermo-mechanical strength properties, particularly when they are walked on. In addition, complicated processes are required to produce such material combinations.

SUMMARY OF THE INVENTION

It is an object of the present invention to provide a film-bitumen combination that does not have the above disadvantages and is in addition easy to manufacture.

In accordance with the invention, these and other objects are achieved by providing a film-bitumen combination having at least two film layers made from different materials. The use of at least two different film layers makes it possible to vary the strength and heat stability of the entire material combination widely.

It has proved to be very advantageous in this context if the film layers have different coefficients of thermal expansion. The response of the material combination to temperature fluctuations can be specified exactly as a result.

It has also proved to be very advantageous if at least one of the film layers is produced from a polyolefin. It is, however, also very advantageous if at least one of the film layers is produced from polypropylene.

It has on the other hand also proved to be extremely advantageous if at least one of the film layers is produced from polyamide and/or polyethylene terephthalate (PET). It is advantageous in this context if the PET layer is oriented. This means that the mechanical properties of the PET layer can be varied widely.

In another very advantageous embodiment, at least one of the film layers is produced from polyacrylonitrile. In a further embodiment, it is also very advantageous if the film layers are laminated to the bituminous membrane individually or together. It is as a result simple to apply the film combination to a bitumen membrane subsequently.

In another very advantageous embodiment, the bituminous compound/membrane is coated on the film layers. An additional operation is eliminated in this way. Cooling of the film layer and the bituminous compound can take place in-line and does not need to be carried out separately.

In another extremely advantageous embodiment, at least one film layer of the material combination facing the bituminous compound/membrane is designed to provide a mineral oil barrier. This is an effective way to prevent diffusion of the mineral oils into the plastic combination. Swelling of the material combination is avoided as a result.

It has also proved to be very advantageous if at least one edge of part of the film layers projects beyond the bituminous membrane. This makes it possible to join several membranes together simply. Leakage in the joint area is eliminated effectively.

It has, however, also proved to be very advantageous if at least one edge of part of the film layers, preferably the layers facing away from the bituminous compound, is shorter than the other layers. Adjacent membranes can be joined together very simply and reliably in this way too.

In another advantageous embodiment, the surface of the side of the plastic combination facing away from the bituminous layer is treated to have non-slip properties. This prevents inadvertent slipping when the material combination is being laid.

It has proved to be very advantageous in this context if the non-slip treatment is carried out by means of coating. It has proved to be very advantageous in this context if the coating is applied to be shorter than the film layers and/or the bituminous compound at least along one edge of the material combination. This makes sure that adjacent membranes can be sealed together reliably and tightly.

It has also proved to be very advantageous if the non-slip treatment is carried out by means of at least partial embossing of the surface film. Embossing is an effective way to prevent slipping when the surface is moist in particular.

It has proved to be very advantageous in this context if the embossing is carried out so that it is shorter at least along one edge of the material combination. This again guarantees that two adjacent membranes can be sealed together flawlessly.

It has also proved to be very advantageous if the non-slip treatment is provided by a coextruded syndiotactic polystyrene (SPS) film. It is, however, also very advantageous if the non-slip treatment is provided by a thermoplastic elastomer with a metallocene complex. The use of a non-slip plastic guarantees non-slip properties over the entire surface.

It is also very advantageous if in accordance with the invention the individual film layers are combined in accordance with their thermal stability. The film combination can be customized to suit the temperatures that occur as a result.

It has, however, also proved to be very advantageous if the individual film layers are combined according to their mechanical strength. This means that the film combination can be varied to cope with the mechanical stresses that can be expected, e.g. when it is walked on.

It is very advantageous in this context if a tie layer and/or adhesive is provided between two adjacent layers. This improves the bond between adjacent layers.

It has also proved to be very advantageous if a barrier layer particularly against mineral oils, oxygen and/or ultraviolet (UV) radiation is provided between two adjacent layers. Harmful effects are prevented as a result.

It is also very advantageous in accordance with another embodiment if a layer of lacquer is provided as a barrier particularly against oils, oxygen and/or UV radiation. Lacquer layers can be applied particularly simply.

In another very advantageous embodiment, a film layer located further away from the bituminous layer has a larger coefficient of elongation than a film layer that is located closer. This makes sure that the edges of the film layer do not detach from the bitumen layer. On the contrary, these edges are pressed onto the bitumen layer instead.

In another extremely advantageous embodiment, a release liner is provided on the surface of the bituminous membrane facing away from the film layers. It has proved to be advantageous in this context if a release paper or a release film is provided as the release liner. The use of a release film in particular but also the use of a thin release paper improves handling when the material combination is applied.

It has proved to be very advantageous if the release liner is coated with silicone. Silicone has excellent release properties.

It has also proved to be very advantageous if the release liner consists of several sections. This makes it considerably easier to apply the membranes, as the membranes can be applied in sections.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

DETAILED DESCRIPTION OF PREFERRED EMBODIMENTS

Figure 1:
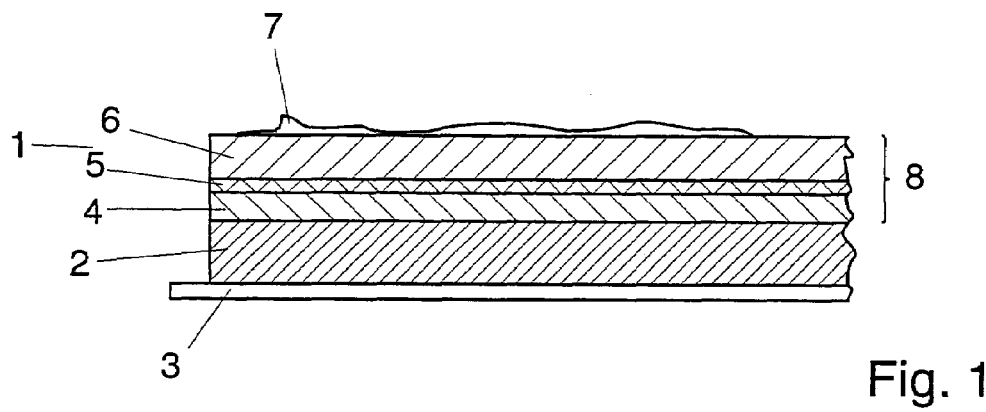
FIG. 1 is a cross section of a multilayer film-bitumen structure.
Figure 2:
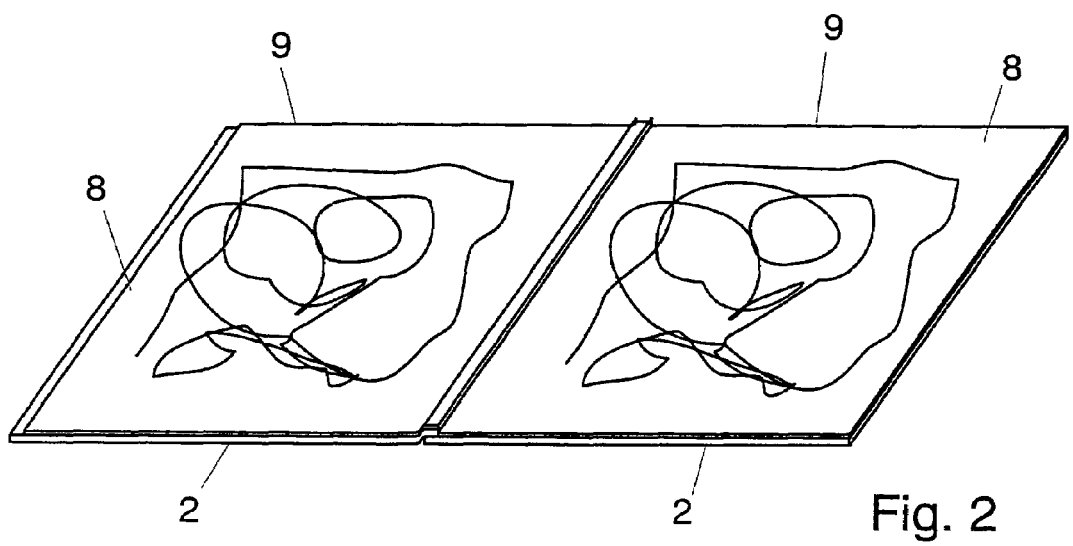
FIG. 2 is a picture of such a material combination that can be applied to a roof.

Turning now in detail to the drawings, FIG. 1 shows a multilayer film-bitumen combination. Combination 1 has a bottom layer 2 made from a cold self-adhesive bitumen compound. Bottom layer 2 is covered by a siliconized release film 3. A barrier layer 4, which prevents the migration of mineral oils contained in the bitumen layer 2, is provided on the other side of bitumen layer 2. Barrier layer 4 can be made from, for example, a polyamide, a polyamide (PA) alloy or mixture, polyethylene terephthalate (PET), oriented polyethylene terephthalate (O-PET) or a lacquer. This barrier layer 4 is followed by an adhesive/tie layer 5, which can consist of just a tie layer, a mixture of a tie layer and polypropylene or polyethylene or a similar material or can be a hotmelt adhesive, a polyurethane (PU) adhesive or a similar material instead. This adhesive/tie layer 5 is followed by a top layer 6 made from a polyolefin. The top layer 6 can be made from polypropylene (PP), linear low density polyethylene (LLDPE), low density polyethylene (LDPE), high density polyethylene (HDPE) or polyacrylonitrile or derivatives and/or blends of them. Further film layers may be provided according to the application area which have specific mechanical, physical or chemical properties. A non-slip coating 7 is provided on the upper side of top layer 6.

As shown in FIG. 1, the film layers 8 consist of the barrier layer 4, the tie layer 5 and the top layer 6. Film layers 8 project beyond bitumen layer 2 at least at one edge. It is, however, also possible that the film layers project beyond bitumen layer 2 at several edges or are shorter than bitumen layer 2 at one or more edges. Leakage is avoided as a result in the areas where different membranes 9 are joined, depending on the application concerned. Not only the adjacent bitumen layers 2 but also the film layers 8 of two membranes 9 can be sealed and/or glued together.

In prior combinations, because the bitumen is applied hot, relatively thick release paper is used. The big advantages of release film 3 over the relatively thick release paper used up to now are that little waste is produced in processing and that the release properties are not adversely affected by moisture. It is also possible in this context for release film 3 to be divided, as a result of which this film can be pulled off in several pieces. This can facilitate processing considerably.

Figure 3:
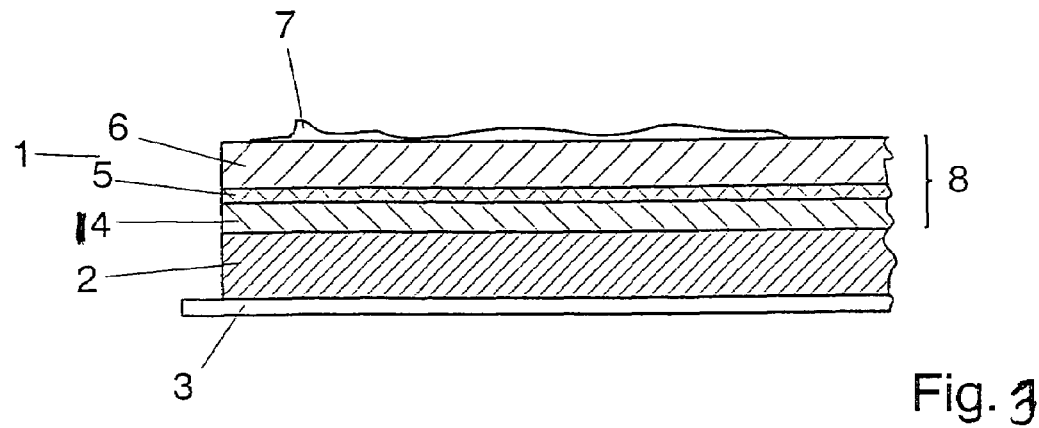
FIG. 3 is a cross-section of another multilayer film bitumen structure.
Figure 4:
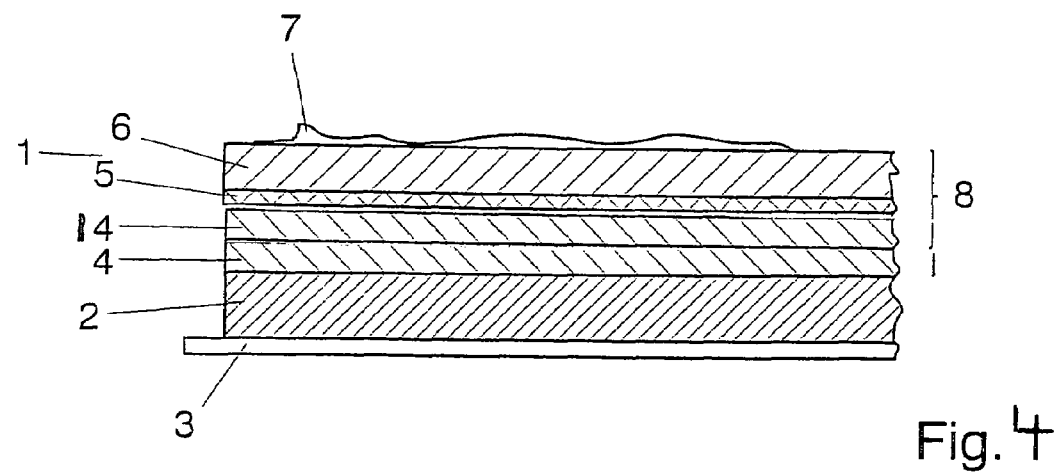
FIG. 4 is a cross-section of a further multilayer film bitumen structure.

Swelling of the film web 5/6 facing the bitumen layer 2 due to the migration of mineral oils is avoided by the inclusion of a barrier layer 4. If swelling occurs, there is a danger that film 8 will detach from bitumen layer 2. As shown in FIGS. 3 and 4, if film layers 14 and 6 are chosen suitably, detachment of film 8 from bitumen layer 2 because of the effects of heat can be prevented. Film layers 14 and 6 should be selected so that the thermal expansion of film layer 6 is larger than that of film layer 14. This means that film 8 is actively pressed against bitumen layer 2 at higher temperatures at which the adhesive force of bitumen layer 2 is reduced. This is evident primarily at the edges, as the phenomenon known as curling which occurs with standard films for bitumen membranes, e.g. oriented and cross-laminated HDPE films with a symmetrical film structure, no longer occurs in this case.

The mechanical strength level required for the material combination 1 in each case can be achieved by choosing a suitable top film 6 too. This means that the material combination 1 can be designed to be so hard-wearing that it can also be walked on.

Barrier layer 4 preferably has a thickness between 2 and 110μ, adhesive/tie layer 5 preferably has a thickness between 1 and 130μ, and top layer 6 preferably has a thickness between 5 and 300μ.

The film combination 8 or at least part of it is produced when the material combination 1 is manufactured. Bitumen membrane 2 is either laminated to it when it has already cooled down to some extent or is applied directly to the film layers 8. When it is applied via an output die, for example, a cooling device such as a cooling roller has to be provided for the film layers 8. Either steel band or water cooling facilities are obvious solutions here.

Release film 3 is not applied until after this. This film does not therefore need to be thermally stable, as is the case with the production processes that have been standard in the past. This release film 3 can then be chosen according to the initial tearing and tear propagation properties required. A more effective bond is achieved by the immediate and direct joining of the bitumen membrane 2 and the film combination 8 as well.

While only a few embodiments of the present invention have been shown and described, it is to be understood that many changes and modifications may be made thereunto without departing from the spirit and scope of the invention as defined in the appended claims.

What is claimed is:

1. A film-bitumen combination comprising of at least three layers wherein said at least three layers comprise a bituminous layer and at least two film layers made from different materials, said bituminous layer being coated on said at least two film layers;

said at least two film layers comprise a first film layer and a second film layer produced from a polyolefin, polypropylene, polyamide, polyethylene terephthalate (PET), or polyacrylonitrile;

said first film layer being located further away from said bituminous layer and having a larger coefficient of thermal expansion than said second film layer;

wherein at least a first edge of said at least two film layers projects beyond the bituminous layer and at least a second edge of said at least two film layers is shorter than the bituminous layer;

wherein a surface of a side of the combination facing away from the bituminous layer has been treated to have non-slip properties;

wherein each individual film layer is arranged in the combination in accordance with its thermal stability and its mechanical strength;

a barrier layer against mineral oils, oxygen or UV radiation disposed between the bituminous layer and two adjacent layers of said at least two film layers; and wherein said barrier layer consists of a layer of lacquer; and wherein the phenomenon known as curling which occurs with a symmetrical structure no longer occurs with said film-bitumen combination.

2. The combination according to claim 1, wherein said at least two film layers have different coefficients of thermal expansion.

3. The combination according to claim 1, wherein at least one of said at least two film layers is produced from polyethylene terephthalate (PET) and the PET layer is oriented.

4. The combination according to claim 1, wherein said at least two film layers are laminated to said bituminous layer individually or together.

5. The combination according to claim 4, wherein at least one film layer facing the bituminous layer provides a mineral oil barrier.

6. The combination according to claim 1, wherein said second edge is on the layers facing away from the bituminous layer.

7. The combination according to claim 1, wherein the non-slip treatment is carried out by means of coating.

8. The combination according to claim 7, wherein the coating is applied to be shorter than the film layers or the bituminous layer at least along one edge of the combination.

9. The combination according to claim 1, wherein the non-slip treatment is carried out by means of at least partial embossing of said surface.

10. The combination according to claim 9, wherein the embossing is shorter at least along one edge of the combination.

11. The combination according to claim 1, wherein the non-slip treatment is provided by a coextruded syndiotactic polystyrene (SPS) film.

12. The combination according to claim 1, wherein the non-slip treatment is provided by a thermoplastic elastomer with a metallocene complex.

13. The combination according to claim 1, further comprising a tie layer or an adhesive disposed between two adjacent layers of said at least two film layers.

14. The combination according to claim 4, wherein said bituminous layer has a surface facing away from said at least two film layers and a release liner is provided on said surface.

15. The combination according to claim 14, wherein said release liner comprises a release paper or a release film.

16. The combination according to claim 14, wherein the release liner is coated with silicone.

17. The combination according to claim 14, wherein the release liner has several sections.

* * * * *